United States Patent
Shlain et al.

(10) Patent No.: US 9,715,723 B2
(45) Date of Patent: Jul. 25, 2017

(54) OPTIMIZATION OF UNKNOWN DEFECT REJECTION FOR AUTOMATIC DEFECT CLASSIFICATION

(75) Inventors: Vladimir Shlain, Haifa (IL); Gadi Greenberg, Tel-Aviv (IL); Idan Kaizerman, Meitar (IL); Efrat Rozenman, Asseret (IL)

(73) Assignee: Applied Materials Israel Ltd, Rehovot, IL (US)

( * ) Notice: Subject to any disclaimer, the term of this patent is extended or adjusted under 35 U.S.C. 154(b) by 0 days.

(21) Appl. No.: 13/451,500

(22) Filed: Apr. 19, 2012

(65) Prior Publication Data
US 2013/0279795 A1 Oct. 24, 2013

(51) Int. Cl.
- G06T 7/00 (2017.01)
- G06K 9/03 (2006.01)
- G06K 9/62 (2006.01)

(52) U.S. Cl.
CPC .......... G06T 7/0004 (2013.01); G06K 9/033 (2013.01); G06K 9/6269 (2013.01);
(Continued)

(58) Field of Classification Search
CPC . G06T 2207/10016; G06T 2207/30168; G06T 2207/30148; G06T 2207/10061; G06T 2207/30141; G06T 2207/30108; G06T 7/0004; G06T 7/0002; G06T 7/0006; G06T 2207/20081; G01N 21/88; G06K 9/6267; G06K 9/6276; G06K 9/66; G06K 9/6227; G06K 9/6278; G06K 9/6279; G06K 9/628; G06K 9/6282; G06K 9/6284;
(Continued)

(56) References Cited

U.S. PATENT DOCUMENTS 5,991,699 A 11/1999 Kulkarni et al.
6,148,099 A * 11/2000 Lee et al. .................. 382/149
(Continued)

FOREIGN PATENT DOCUMENTS

JP 2007-225531 A 9/2007
JP 2008-529067 A 7/2008
(Continued)

OTHER PUBLICATIONS

David M.J. Tax; Robert P.W. Duin, "Support Vector Data Description", Jan. 2004, Machine learning, vol. 54, pp. 45-66.*
(Continued)

Primary Examiner — Sumati Lefkowitz
Assistant Examiner — Carol Wang
(74) Attorney, Agent, or Firm — Lowenstein Sandler LLP (57) ABSTRACT

A method for defect classification includes storing, in a computer system, a definition of a region in a feature space. The definition is associated with a class of defects and comprises a kernel function comprising a parameter. The parameter determines a shape of the region. A confidence threshold for automatic classification of at least one defect associated with the class is received. A value of the parameter associated with the confidence threshold is selected. Inspection data for a plurality of defects detected in one or more samples under inspection is received. The plurality of defects for the class are automatically classified using the kernel function and the selected value of the parameter.

21 Claims, 6 Drawing Sheets

(52) U.S. Cl.
CPC .. *G06K 9/6284* (2013.01); *G06T 2207/10061* (2013.01); *G06T 2207/20076* (2013.01); *G06T 2207/20081* (2013.01); *G06T 2207/30148* (2013.01)

(58) Field of Classification Search
CPC .............. G06K 9/6286; G06K 9/6287; G06F 17/30247; G06F 19/24
See application file for complete search history.

(56) References Cited

U.S. PATENT DOCUMENTS

| | | | |
|---|---|---|---|
| 6,195,458 | B1 | 2/2001 | Warnick et al. |
| 6,256,093 | B1 | 7/2001 | Ravid et al. |
| 6,288,782 | B1 | 9/2001 | Worster et al. |
| 6,292,582 | B1 | 9/2001 | Lin et al. |
| 6,650,779 | B2 * | 11/2003 | Vachtesvanos et al. ...... 382/228 |
| 6,763,130 | B1 | 7/2004 | Somekh et al. |
| 6,922,482 | B1 | 7/2005 | Ben-Portal |
| 6,999,614 | B1 | 2/2006 | Bakker et al. |
| 7,106,434 | B1 | 9/2006 | Mapoles et al. |
| 7,113,628 | B1 | 9/2006 | Obara et al. |
| 7,318,051 | B2 * | 1/2008 | Weston et al. .................. 706/12 |
| 7,570,796 | B2 | 8/2009 | Zafar et al. |
| 7,570,800 | B2 | 8/2009 | Lin et al. |
| 7,684,609 | B1 | 3/2010 | Toth et al. |
| 7,756,320 | B2 | 7/2010 | Honda et al. |
| 7,756,658 | B2 | 7/2010 | Kulkarni et al. |
| 8,112,241 | B2 | 2/2012 | Xiong |
| 8,175,373 | B2 | 5/2012 | Abbott et al. |
| 8,194,968 | B2 | 6/2012 | Park et al. |
| 8,502,146 | B2 | 8/2013 | Chen et al. |
| 8,983,179 | B1 * | 3/2015 | Yu ............................ G06K 9/38 382/159 |
| 2002/0159641 | A1 | 10/2002 | Whitney et al. |
| 2002/0159643 | A1 | 10/2002 | DeYong et al. |
| 2002/0165837 | A1 * | 11/2002 | Zhang ................... G06K 9/623 706/16 |
| 2002/0168099 | A1 | 11/2002 | Noy |
| 2002/0174344 | A1 * | 11/2002 | Ting ........................ G06F 21/32 713/185 |
| 2003/0167267 | A1 | 9/2003 | Kawatani |
| 2004/0013304 | A1 * | 1/2004 | Viola ................. G06K 9/00228 382/224 |
| 2004/0034612 | A1 * | 2/2004 | Mathewson et al. ........... 706/46 |
| 2004/0156540 | A1 | 8/2004 | Gao et al. |
| 2004/0218806 | A1 * | 11/2004 | Miyamoto et al. .......... 382/145 |
| 2004/0263911 | A1 | 12/2004 | Rodriguez et al. |
| 2005/0004774 | A1 | 1/2005 | Volk et al. |
| 2005/0049990 | A1 | 3/2005 | Milenova et al. |
| 2005/0147287 | A1 | 7/2005 | Sakai et al. |
| 2005/0169517 | A1 * | 8/2005 | Kasai ........................... 382/159 |
| 2005/0175243 | A1 | 8/2005 | Luo et al. |
| 2005/0196035 | A1 | 9/2005 | Luo et al. |
| 2006/0009011 | A1 | 1/2006 | Barrett et al. |
| 2006/0048007 | A1 | 3/2006 | Yuan et al. |
| 2006/0112038 | A1 | 5/2006 | Luo |
| 2007/0047800 | A1 | 3/2007 | Hiroi et al. |
| 2007/0053580 | A1 | 3/2007 | Ishikawa |
| 2007/0063548 | A1 * | 3/2007 | Eipper ..................... 296/203.01 |
| 2008/0013784 | A1 * | 1/2008 | Takeshima et al. .......... 382/100 |
| 2008/0075352 | A1 * | 3/2008 | Shibuya et al. .............. 382/141 |
| 2009/0136121 | A1 | 5/2009 | Nakagaki et al. |
| 2009/0157578 | A1 | 6/2009 | Sellamanickam et al. |
| 2009/0171662 | A1 * | 7/2009 | Huang et al. .................. 704/251 |
| 2009/0305423 | A1 | 12/2009 | Subramanian et al. |
| 2011/0026804 | A1 * | 2/2011 | Jahanbin et al. ............. 382/141 |
| 2012/0027285 | A1 * | 2/2012 | Shlain et al. ................. 382/149 |
| 2012/0054184 | A1 | 3/2012 | Masud et al. |
| 2013/0279794 | A1 | 10/2013 | Greenberg et al. |
| 2013/0304399 | A1 | 11/2013 | Chen et al. |
| 2013/0318485 | A1 | 11/2013 | Park et al. |
| 2014/0050389 | A1 | 2/2014 | Mahadevan et al. |

FOREIGN PATENT DOCUMENTS

| | | |
|---|---|---|
| JP | 2009-103508 A | 5/2009 |
| JP | 2010-514226 A | 4/2010 |
| WO | WO2013/140302 A1 | 9/2013 |
| WO | WO2013/169770 A1 | 11/2013 |

OTHER PUBLICATIONS

Varewyck, Matthias, and J-P. Martens. "A practical approach to model selection for support vector machines with a Gaussian kernel." Systems, Man, and Cybernetics, Part B: Cybernetics, IEEE Transactions on 41.2 (2011): 330-340.*

Wang, Wenjian, et al. "Determination of the spread parameter in the Gaussian kernel for classification and regression." Neurocomputing 55.3 (2003): 643-663.*

Xu, Zongben, Mingwei Dai, and Deyu Meng. "Fast and efficient strategies for model selection of Gaussian support vector machine." Systems, Man, and Cybernetics, Part B: Cybernetics, IEEE Transactions on 39.5 (2009): 1292-1307.*

Ban, Tao, and Shigeo Abe. "Implementing multi-class classifiers by one-class classification methods." In Neural Networks, 2006. IJCNN'06. International Joint Conference on, pp. 327-332. IEEE, 2006.*

Tax, David MJ, and Piotr Juszczak. "Kernel whitening for one-class classification." In Pattern Recognition with Support Vector Machines, pp. 40-52. Springer Berlin Heidelberg, 2002.*

Akay, Mehmet Fatih. "Support vector machines combined with feature selection for breast cancer diagnosis." Expert systems with applications 36, No. 2 (2009): 3240-3247.*

USPTO, Office Action for U.S. Appl. No. 13/451,496, mailed Dec. 23, 2014.

"Ou, Guobin, and Yi Lu Murphey. ""Multi-class pattern classification using neural networks."" Pattern Recognition 40, No. 1 (2007):4-18."

"Chernova, Sonia, and Manuela Veloso. ""Multi-thresholded approach to demonstration selection for interactive robot learning. "" InHuman-Robot Interaction (HRI), 2008 3rd ACM/IEEE International Conference on, pp. 225-232. IEEE, 2008."

"Li, Te-Sheng, and Cheng-Lung Huang. ""Defect spatial pattern recognition using a hybrid SOM-SVM approach in semiconductormanufacturing."" Expert Systems with Applications 36.1 (Jan. 2009): 374-385."

Vapnik, Vladimir N., Section 5.4 The Optimal Separating Hyperplane, The Nature of Statistical Learning Theory, Statistics for Engineering and Information Science, Second Edition, 2000, 1995 Srpinger-Verlag, New York, Inc. pp. 131-163.

Chih-Chung Chang and Chih-Jen Lin, "LIBSVM: A Library for Support Vector Machines," National Taiwan University (2001), updated Mar. 6, 2010, pp. 1-30.

Assaf Glazer and Moshe Sipper, "Evolving an Automatic Defect classification Tool," EvoWorkshops 2008, LNCS 4974 (Springer-Verlag, 2008), pp. 194-203.

Wang, Peng, Christian Kohler, and Ragini Verma. "Estimating cluster overlap on Manifolds and its Application to Neuropsychiatric Disorders." Computer Vision and Pattern Recognition, 2007. CVPR'07. IEEE Conference on. IEE, 2007.6 pages.

LIBSVM—a Library for Support Vector Machines, as downloaded from ww.csie.ntu.edu.tw/~cjlin/libsvm on Jul. 27, 2010.

Scholkopf, Bernhard et al., "New Support Vector Algorithms," Neural Computation 12 (2000), Massachusetts Institute of technology, pp. 1207-1245.

* cited by examiner

OPTIMIZATION OF UNKNOWN DEFECT REJECTION FOR AUTOMATIC DEFECT CLASSIFICATION

RELATED APPLICATIONS

The present application is related to Ser. No. 13/451,496, entitled "Integration of Automatic and Manual Defect Classification," filed on Apr. 19, 2012, which is hereby incorporated by reference.

FIELD OF THE INVENTION

Embodiments of the present invention generally relate to automated inspection, and specifically to methods and systems for analysis of manufacturing defects.

BACKGROUND OF THE INVENTION

Automatic Defect Classification (ADC) techniques are widely used in inspection and measurement of defects on patterned wafers in the semiconductor industry. ADC techniques detect the existence of defects, as well as automatically classify the defects by type in order to provide more detailed feedback on the production process and to reduce the load on human inspectors. ADC techniques are used, for example, to distinguish among types of defects arising from particulate contaminants on a wafer surface and defects associated with irregularities in the microcircuit pattern itself, and may also identify specific types of particles and irregularities.

Various methods for ADC have been described in the patent literature. For example, U.S. Pat. No. 6,256,093 describes on-the-fly ADC in a scanned wafer. A light source illuminates the scanned wafer so as to generate an illuminating spot on the wafer. Light scattered from the spot is sensed by at least two spaced-apart detectors, and is analyzed so as to detect defects in the wafer and classify the defects into distinct defect types.

As another example, U.S. Pat. No. 6,922,482 describes automatically classifying a defect on the surface of a semiconductor wafer into one of a number of core classes, using a core classifier employing boundary and topographical information. The defect is then further classified into a subclass using a specific adaptive classifier that is associated with the core class and trained to classify defects from only a limited number of related core classes. Defects that cannot be classified by the core classifier or the specific adaptive classifiers are classified by a full classifier.

SUMMARY

Embodiments of the present invention provide improved methods, systems and software for automated classification of defects based on inspection data. An exemplary computing system stores a definition of a region in a feature space. The definition is associated with a class of defects and comprises a kernel function comprising a parameter. The parameter determines a shape of the region. The computing system receives a confidence threshold for automatic classification of at least one defect associated with the class. The computing system selects a value of the parameter associated with the confidence threshold. The computing system receives inspection data for a plurality of defects detected in one or more samples under inspection. The computing system automatically classifies the plurality of defects for the class using the kernel function and the selected value of the parameter.

In one embodiment, the computer system selects the value of the parameter by associating each of a plurality of confidence levels with a unique parameter value of a plurality of parameter values and selecting the parameter value that is associated with the confidence threshold.

In one embodiment, the computer system associates the plurality of confidence levels by applying the kernel function to training data to obtain a set of training results using the plurality of parameter values and assigning an optimal parameter value to each confidence level based on the training results.

In one embodiment, the computer system assigns the optimal parameter value to each confidence level by selecting a parameter value for each confidence threshold to result in rejection of a subset of the plurality of defects corresponding to the confidence threshold during an automatic classification of the training data using the kernel function.

In one embodiment, the region in the feature space is defined by a one-class support vector machine comprising the kernel function, and wherein automatically classifying the plurality of defects comprises distinguishing between a plurality of first defects belonging to the class and a plurality of second defects that are classified as unknown defects with respect to the class using the one-class support vector machine.

In one embodiment, the computer system automatically classifies the plurality of defects by applying a multi-class support vector machine to assign each defect to a respective defect class and identifying at least one non-decidable defect, wherein the non-decidable defect is in an overlap area between a plurality of regions of at least two of the defect classes in the feature space.

In one embodiment, the one-class support vector machine defines a mapping of the inspection data to a hypersphere in the feature space, and wherein the confidence level and the value of the parameter define a hyperplane that divides the hypersphere to create a hyperspherical cap, wherein the hyperspherical cap is mapped to a region in feature space containing the plurality of defects classified as belonging to the class.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Automatic defect classification (ADC) systems are commonly calibrated using a set of training data containing a collection of defects that have been pre-classified by a human expert. The ADC system uses the training data in order to set classification rules defined as functions of feature values that are associated with each defect class in a multi-dimensional feature space. The multi-dimensional feature space may also be referred to as a hyperspace when classification involves more than three features. In most existing ADC systems, these settings are then tested and adjusted to optimize their accuracy, which is defined as the percentage of all defects that are classified correctly.

In many ADC applications, however, purity of classification may be a more meaningful measure of system operation. Purity of classification may be the percentage of the remaining defects (e.g., defects found by the ADC system to be classifiable and not rejected) that are classified correctly. The system operator may specify a classification performance measure, such as a desired purity and/or a certain maximum rejection rate. The classification performance measure may be a percentage of defects that the ADC system is unable to classify with confidence and therefore returns for classification by a human expert (e.g., system operator). Since it is likely that there will always be some percentage of defects that is rejected by the ADC system, purity of classification may be of greatest concern to the operator.

Purity of classification can be affected by various types of classification uncertainty. In some cases, feature values associated with a defect may fall in a region of overlap between two (or more) different defect classes. In some cases, the feature values of the defect may lie at the outer borders of the range associated with a given defect class. U.S. patent application Ser. No. 12/844,724, filed Jul. 27, 2010, which is hereby incorporated by reference, describes an ADC system that addresses various types of classification uncertainty by applying multiple different classifiers to the inspection data, including both multi-class classifiers and single-class classifiers. The system permits the classifier parameters to be trained and adjusted in order to optimize the purity of classification.

Embodiments of the present invention provide an ADC system using a multi-class classifier and a single-class classifier. A multi-class classifier partitions a multi-dimensional feature space among multiple defect classes, and assigns each defect to one of the classes depending on its location within the feature space. The multi-class classifier identifies defects in overlap areas between the classes as non-decidable defects. The multi-class classifier may identify the defects in overlap areas by using a confidence threshold. For each defect class, a single-class classifier applies class-specific rules to identify defects belonging to the defect class and defects not in the class. Defects not in the class may be identified using a confidence threshold for the class, and may be identified as unknown defects. The single-class and multi-class classifiers are used together in classifying defects with high purity. The extent of the outer borders and overlap areas of the different classes are adjusted by means of variable confidence thresholds, in order to maximize purity while keeping the rejection rate no greater than a predefined threshold.

The confidence thresholds for the single-class classifiers (to distinguish between known and unknown defects) and for the multi-class classifier (to distinguish between decidable and non-decidable defects) can be adjusted during a training process using a set of defects that have been manually pre-classified by a human operator. The result of the training process can be a set of classification rules (also referred to as rejection rules) which define the boundaries in a feature space of each defect class. The set of classification rules can define the respective range of inspection feature values that characterize the class. The classification rules also provide a confidence measure that gives the level of confidence associated with each single-class or multi-class classification of a defect as a function of the location of the defect in the feature space.

In one embodiment, each single-class classifier is defined by a kernel function, which defines the region in the feature space that is occupied by the class. Defects inside the region may be classified as belonging to the class and defects outside the region may be classified as unknown. A parameter can define the shape of the region in the feature space. During the training process, multiple region contours can be evaluated, and the optimal shape can be found for each confidence threshold.

In classification of actual production defects whose classification is unknown, the confidence thresholds for each classifier may then be chosen in order to achieve the desired level of performance. The classification of actual production defects whose classification is unknown can result in first classification results.

In embodiments of the present invention, defects that are rejected by the automatic classifiers (e.g., classified as non-decidable or unknown) are passed to one or more other inspection modalities, different from the one used for generating the first classification results, for classification to a defect class, resulting in second classification results. In one embodiment, the inspection modality is a human inspector, who assigns the rejected defects to the appropriate defect classes. In an alternate embodiment, the rejected defects are classified based on additional inspection data (e.g., X-ray inspection data, etc.) that provides additional information on the materials residing at and/or near the locations of the defects. The updated defect assignments for the rejected defects (second classification results) can be passed back to the ADC system. In one embodiment, the ADC system integrates the updated defect assignments (second classification results) with the automatically-classified defects (first classification results) into a combined data set. The ADC system can thus present a complete, unified report of defect distribution in a set of samples. Because of the high purity of the automatic classification results, this unified report can provide the system operator with the most comprehensive and accurate view possible of defect distribution. This sort of view is particularly important, for example, in process control applications, such as in semiconductor device manufacturing.

In some embodiments, the second classification results, together with the corresponding defect images, may be used in refining the automatic classifiers. For example, the multi-class classifiers for defects that occur commonly in the pre-classified training set will typically have high accuracy and purity, while the classifiers for less common defect classes will have lower accuracy and higher rejection rates (since these classes are not well characterized in training data because of their low defect count). The second classification results can be particularly useful in refining the classifiers for these less common defect classes. Once a sufficient defect count is accumulated for the less common defect classes, the less common defect classes can be added to the training set, resulting in an improvement in the accuracy and purity for the less common defect classes. As a consequence of the addition of the less common defect classes, the confidence level for each defect class may also increase and eventually reduce the number of rejected defects.

Although the disclosed embodiments relate specifically to detection of defects in semiconductor wafers, the principles of the present invention may similarly be applied to automated analysis and classification of image features of other types. Furthermore, although these embodiments are built on certain specific types and combinations of classifiers, inspection systems in other embodiments of the present invention may use classifiers of other types, as are known in the art. Specifically, the principles by which different inspection modalities are integrated in such a system may be applied over many different automatic and manual classification techniques.

Figure 1:
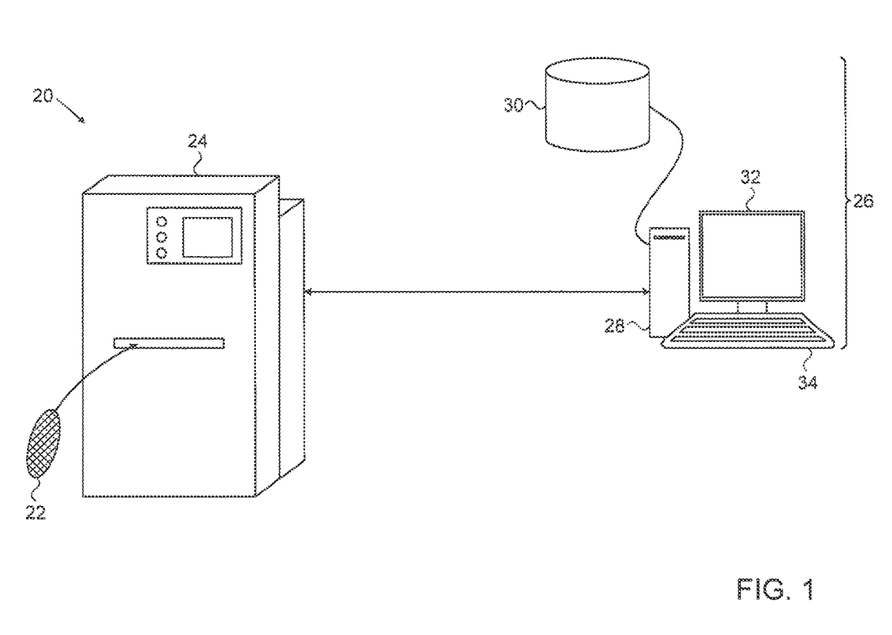
FIG. 1 is an exemplary schematic illustration of a defect inspection and classification system, in accordance with an embodiment of the present invention.

FIG. 1 is an exemplary schematic illustration of a system 20 for automated defect inspection and classification, in accordance with an embodiment of the present invention. A sample, such as a patterned semiconductor wafer 22, is inserted into an inspection machine 24. This machine may comprise, for example, a scanning electron microscope (SEM) or an optical inspection device or any other suitable sort of inspection apparatus that is known in the art. Machine 24 typically reviews the surface of wafer 22, senses and processes the review results, and outputs inspection data, comprising, for example, images of defects on the wafer. In one embodiment, the inspection data includes a list of defects found on the wafer, the location of each defect, along with values of inspection features associated with each defect. The inspection features may include, for example, the size, shape, scattering intensity, directionality, and/or spectral qualities of the defect, as well as defect context and/or any other suitable features that are known in the art.

Although the term "inspection data" is used in the present embodiment to refer to SEM images and associated metadata, this term should be understood more broadly to refer to any and all sorts of descriptive and diagnostic data that can be collected and processed to identify features of defects, regardless of the means used to collect the data, and regardless of whether the data are captured over the entire wafer or in portions, such as in the vicinity of individual suspect locations. Some embodiments are applicable to the analysis of defects identified by an inspection system that scans the wafer and provides a list of locations of suspected defects. Other embodiments are applicable to the analysis of defects that are re-detected by a review tool based on locations of suspected defects that were provided by an inspection tool. The invention is not limited to any particular technology by which the inspection data is generated. Thus, for semiconductor applications, embodiments of the invention may be applied to the analysis of data generated by an optical inspection system such as the UVision™ system, a review system such as the SEMVision™ system (both commercially available from Applied Materials Inc.), or by any other sort of inspection system or modality that is known in the art.

ADC machine 26 receives and processes the inspection data outputted by inspection machine 24. If inspection machine 24 does not extract all relevant inspection feature values from the images of wafer 22, ADC machine 26 may perform these image processing functions. Although ADC machine 26 is shown in FIG. 1 as being connected directly to the inspection machine output, in some embodiments, ADC machine 26 may operate on pre-acquired, stored inspection data. In alternate embodiments, the functionality of ADC machine 26 may be integrated into inspection machine 24.

ADC machine 26 may be a general-purpose computer, comprising a processor 28 with a memory 30 for holding defect information and classification parameters, along with a user interface comprising a display 32 and input device 34. The computer implementing the functions of ADC machine 26 may be dedicated to ADC functions, or it may perform additional computing functions, as well. In one embodiment, at least some of the ADC functions described herein are performed by dedicated or programmable hardware logic.

ADC machine 26 runs multiple classifiers, including both single-class and multi-class classifiers, as defined above. The embodiments that follow will be described, for the sake of illustration and clarity, with reference to machine 26 and the other elements of system 20, but the principles of these embodiments may likewise be implemented in any classification system that can handle multiple classes of defects or other unknown features.

Figure 2:
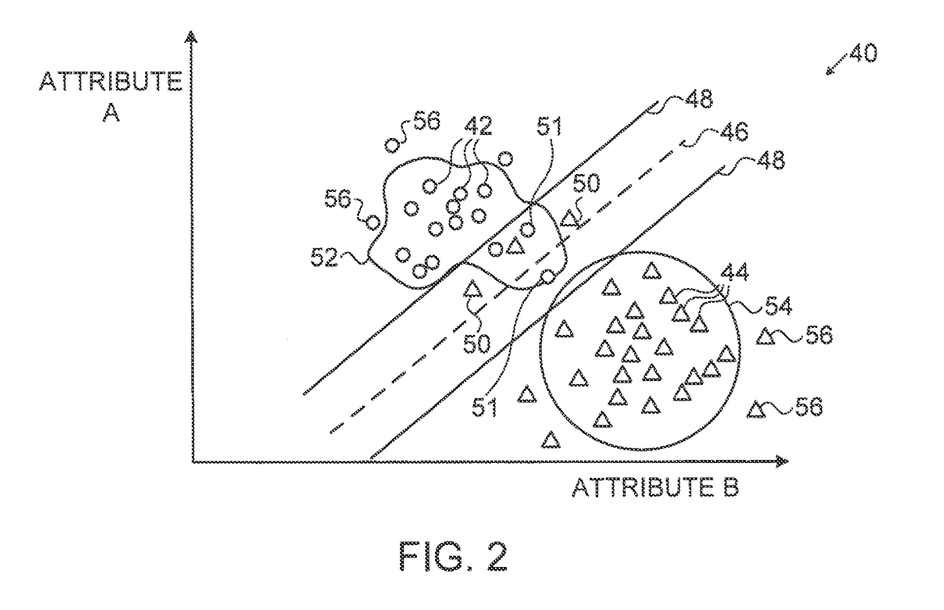
FIG. 2 is a schematic representation of a feature space containing inspection feature values belonging to different defect classes, in accordance with an embodiment of the present invention.

FIG. 2 is an exemplary schematic representation of a feature space 40 to which a set of defects 42, 44, 50, 51, 56 is mapped, in accordance with an embodiment of the present invention. Although the feature space 40 is represented as being two-dimensional, but the classification processes that are described herein are commonly carried out in spaces of higher dimensionality. The defects in FIG. 2 are assumed to belong to two different classes, one associated with defects 42 (which will be referred to below as "Class I"), and the other associated with defects 44 (which will be referred to below as "Class II"). Defects 42 are bounded in the feature space 40 by a border 52, while defects 44 are bounded in the feature space 40 by a border 54. The borders may overlap.

An ADC machine can apply two types of classifiers to classify the defects: a multi-class classifier and at least one single-class classifier. The multi-class classifier distinguishes between Classes I and II. In one embodiment, the multi-class classifier is a binary classifier, which defines a boundary 46 between the regions associated with the two classes. In some embodiments, the ADC machine performs multi-class classification by superposing multiple binary classifiers, each corresponding to a different pair of classes, and assigning each defect to the class that receives the most positive votes from the multiple binary classifiers. Once defects have been classified by the multi-class classifier, single-class classifiers, represented by borders 52 and 54, identify the defects that can be reliably assigned to the respective class, while rejecting the defects outside the borders as "unknown." These single-class classifiers are described in greater detail in U.S. patent application Ser. No. 12/844,724, and are described further below in conjunction with FIG. 3.

In some embodiments, a system operator of the ADC machine provides confidence thresholds, which determine the loci of the boundaries of the regions in feature space 40 that are associated with the defect classes. Setting the confidence threshold for multi-class classification can be equivalent to placing borders 48 on either side of boundary 46. In some embodiments, the higher the confidence threshold, the farther apart will borders 48 be. The ADC machine may reject defects 51, which are located between borders 48 but within border 52 or 54, as "undecidable," because the ADC machine may be unable to automatically assign these defects to one class or the other with the required level of confidence. In one embodiment, the undecidable defects are provided to a human inspector, such as the system operator, for classification. In one embodiment, the undecidable defects are provided to a modality that adds new knowledge not available to the previous classifiers for classification.

In some embodiments, the confidence thresholds control the shape of a border of the single-class classifiers. The shape may refer to the geometrical form of a border, and may also refer to the extent of the border. The shape may be associated with a parameter of a kernel function that is used in implementing the single-class classifiers. For each value of the confidence threshold, the ADC machine chooses an optimal value of the parameter, as is described in greater detail below in conjunction with FIG. 6. In some embodiments, the extent of a border shrinks as the confidence threshold increases, and the geometrical form of the border may also change as different kernel parameter values are selected.

Referring back to FIG. 2, defects 56, fall outside borders 52 and 54 and may therefore be classified as "unknown" defects, although defects 56 may have been decided by the multi-class classifier. Defects 50, which are both outside borders 52 and 54, and between borders 48, are also considered "unknown," because defects 50 fall outside borders 52 and 54 In some embodiments, setting a lower confidence threshold could expand border 52 and/or 54 sufficiently to contain the defects 50 and/or defects 56, resulting in the rejection of fewer defects by the ADC machine. However, by setting a lower confidence levels, more classification errors may be made by the ADC machine, thus reducing the purity of classification. In some embodiments, increasing the confidence threshold may enhance the purity of classification, but may result in a higher rejection rate (more defects will be rejected by the ADC machine as unknown).

Figure 3A:
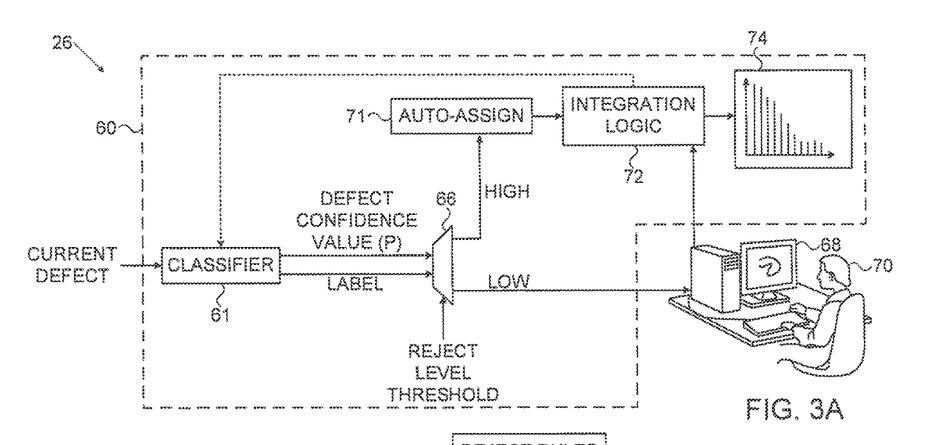
FIG. 3A is a block diagram of an automated defect classification system, in accordance with an embodiment of the present invention.

FIG. 3A is a block diagram illustrating functional elements of an ADC machine (e.g., ADC machine 26 of FIG. 2), in accordance with an embodiment of the present invention. In some embodiments, automatic processing components 60 are executed by processor 28 of FIG. 1, while a human inspector 70 interacts with ADC machine 26 of FIG. 1 via an inspection terminal 68. Automatic processing components 60 may be implemented, for example, as software modules, although at least some of the components may alternatively be implemented in hardware logic or as a combination of hardware and software elements.

In some embodiments, image processing operations are applied by a processor (e.g., processor 28 of FIG. 1) to each defect image captured by an inspection machine (e.g., inspection machine 24 of FIG. 1). The image processing operations may extract a vector of feature values for the defect image, such as shape, texture, and contextual features. Automatic classifier 61 can assign a class label to each defect, along with a confidence value associated with the class label. The confidence value may indicate the likelihood that the defect actually belongs to the assigned class.

A comparator 66 can compare the confidence value to a confidence threshold. In one embodiment, the confidence threshold is provided by an operator of an ADC machine. In an alternate embodiment, the confidence threshold is computed by the ADC machine based on one or more classification performance measures specified by the operator, such as the target purity and/or the maximum rejection rate. If the confidence of classification of a given defect satisfies the confidence threshold (reject level threshold), an automatic assignment module 71 can accept the classification as correct. In one embodiment, if the confidence of classification does not satisfy the confidence threshold, the defect may be rejected and passed to terminal 68 for visual classification by inspector 70. In one embodiment, the rejected defects are analyzed using additional automatic classification procedures, such as X-ray spectroscopy, etc. In some embodiments, the confidence threshold is determined in order to achieve a balance between the number of rejections and the purity of the classification results. Although FIG. 3A shows a single reject level threshold, in alternative embodiments the system operator may set different rejection level thresholds or confidence thresholds for different defect classes.

Integration logic 72 can receive both the automatic classification results from module 71 and the classification results of visual classification from terminal 68 and can generate an integrated report 74. The report 74 may be presented, for example, on display 32, and may show the distribution of defects among the different classes. In some embodiments, the portion of the distribution relating to more common defect types comes from the automatic classification process, while the less common defect types are classified visually. The report 74 may provide the system operator with a complete picture of the sample or samples under test, with optimal purity level.

In some embodiments, information collected by integration logic 72 in the course of processing inspection can be applied in refining classifier 61 (as indicated by the dashed arrow from integration logic 72 to classifier 61 in FIG. 3A). For example, logic 72 may integrate the classification results provided by human inspector 70 and/or by other automatic classification procedures to adjust class borders. In some embodiments, integration logic 72 accumulates visual classification results for a less common class in order to define a reliable automatic classifier for the less common class. In these embodiments, once a predetermined amount of visual classification results are accumulated, the less common class is added to the group of classes which are handled automatically by classifier 61 and automatic assignment module 71.

Figure 3B:
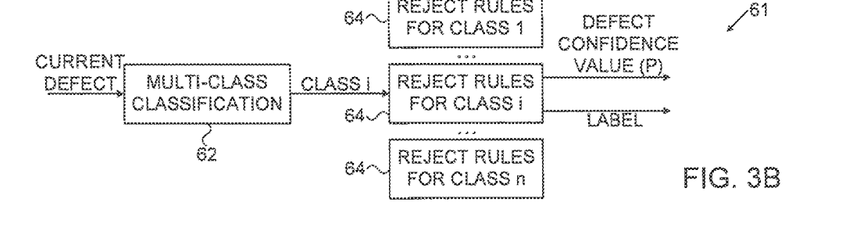
FIG. 3B is a block diagram of an automatic defect classifier, in accordance with an embodiment of the present invention.

FIG. 3B is an exemplary block diagram of a classifier, such as classifier 61 of FIG. 3A, in accordance with an embodiment of the present invention. The classifier can include multi-class classifier 62 and one or more single-class classifiers 64. In one embodiment, the classifier can include a single-class classifier 64 for each defect class in an ADC system. In an alternate embodiment, a single-class classifier 64 can be used for more than one defect class.

Multi-class classifier 62 can process the vector of feature values for each defect to select a defect class for the defect or to reject the defect as undecidable or unknown. In one embodiment, multi-class classifier 62 is a support vector machine. In an alternate embodiment, multi-class classifier 62 is a classifier with similar properties to a support vector machine.

Single-class classifier 64 can check the features of a defect against one or more rejection rules for the class or classes represented by single-class classifier 64. The operation of single-class classifier 64 is described in greater detail in conjunction with FIG. 6, and certain aspects of single-class classifier 64 are also described in the above-mentioned U.S. patent application Ser. No. 12/844,724.

Figure 4:
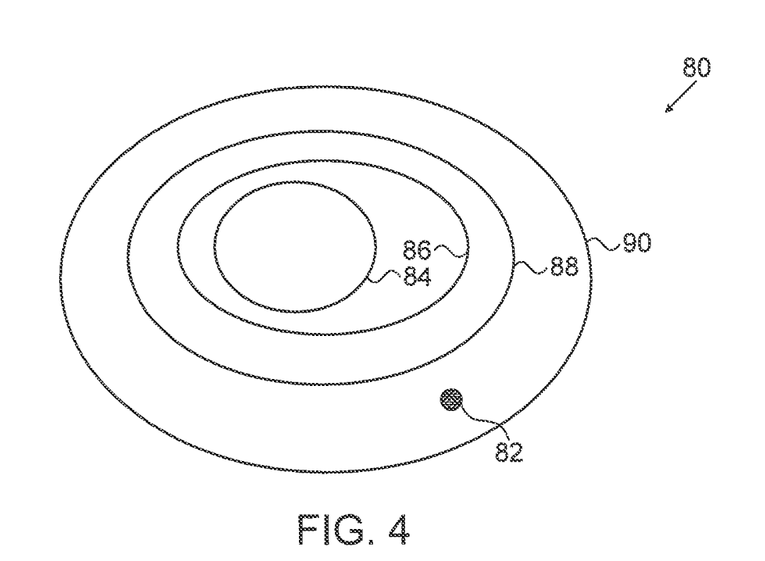
FIG. 4 is an exemplary schematic representation of confidence thresholds in a feature space, in accordance with an embodiment of the present invention.

FIG. 4 is an exemplary schematic representation of a feature space 80, showing borders 84, 86, 88, 90 for a given defect class, in accordance with an embodiment of the present invention. In some embodiments, each border 84, 86, 88, 90 may correspond to a different confidence threshold. In some embodiments, each border 84, 86, 88, 90 may correspond to a different rejection rate or class percentile statistic. For example, inner border 84 may be generated by taking a high confidence threshold, such that defects falling within border 84 will belong to the given class with high purity. In this example, defects falling outside border 84 will be rejected as "unknown," resulting in a high fraction of defects that are passed to a human inspector or to another inspection modality, although many of these "unknown" defects actually belong to the given class. Each border 86, 88, 90 can correspond to a lower confidence threshold and lower purity, as well as a lower rejection rate.

Application of the classifier represented by FIG. 4 to a defect 82 may result in computation of a certain confidence value for defect 82. The confidence value can correspond to the probability that defect 82 belongs to the class. If the confidence threshold represented by border 88 is chosen by the classifier, defect 82 will be rejected as belonging to the class represented by the classifier. However, if the confidence threshold represented by border 90 is chosen by the classifier, defect 82 will be accepted as belonging to the class represented by the classifier. The manner in which the border is defined in terms of rejection rules for a defect class is further described in conjunction with FIG. 6.

Figure 5:
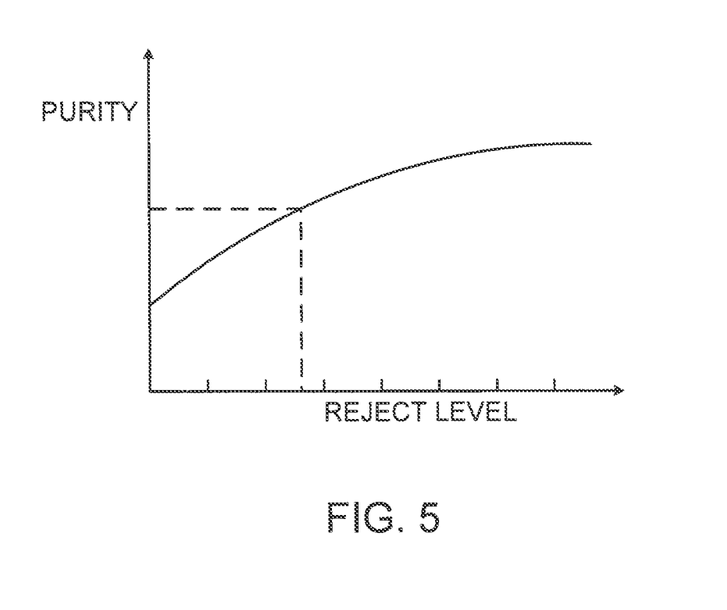
FIG. 5 is an exemplary schematic graph of classification purity as a function of a rejection rate, in accordance with an embodiment of the present invention.

FIG. 5 is an exemplary schematic graph of classification purity as a function of a rejection rate, in accordance with an embodiment of the present invention. In some embodiments, other classification and class extraction measures will have similar dependence on their stability or reliability indications. An ADC machine may generate a graph based on actual results of classification of training data. For this purpose, the ADC machine can compare automatic classification results over a set of defects in the training data to "gold standard" (verification set) visual classification performed by a human inspector. The comparison may be performed for different confidence thresholds (with correspondingly different rejection rates). When all defects are automatically classified by the ADC machine with zero rejection rate, the purity of classification is low, since the machine is required to classify many questionable defects. However, choosing a high rejection rate may give high purity of classification, but may result in requiring the human inspector to spend a larger amount of time in visual classification of defects that are classified as "unknown" by the ADC machine.

An operator (e.g., human inspector) of the ADC machine may use a graph as shown in FIG. 5 to choose a rejection rate that will give the desired purity level or to assess the purity of classification that will result from setting a certain rejection rate.

Figure 6:
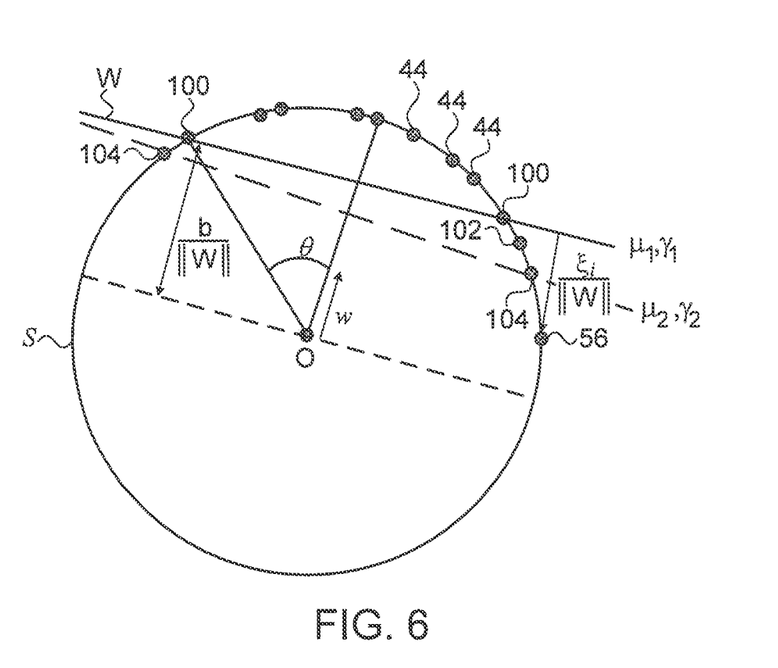
FIG. 6 is an exemplary schematic representation of a feature hyperspace illustrating a single-class classifier, in accordance with an embodiment of the present invention.

FIG. 6 is an exemplary schematic representation of a feature hyperspace, illustrating a single-class classifier used by an ADC machine, in accordance with an embodiment of the present invention. In one embodiment, the single-class classifier is based on a One-class Support Vector Machine (OCSVM), which defines a class border (such as borders 84, 86, 88, 90 of FIG. 4) that is associated with a certain confidence level for the class in question. If a defect falls within the class border, the defect may be considered to belong to the class with this level of confidence. Otherwise, the defect may be classified as unknown.

In one embodiment, OCSVM is a nonlinear kernel-based version of a basic SVM algorithm. A kernel (such as a Gaussian kernel, for example) can be used to transform the input defect data to a high-dimensional space where the classifier is defined. The kernel generates nonlinear separators, but within the kernel space it constructs a linear equation. Specifically, an ADC machine maps the data to an infinite Euclidean feature space H (a Hilbert space), using a mapping $\Phi: R^d \rightarrow H$. For example, the Gaussian kernel function K for defects $x_i$ and $x_j$ (represented by their feature vectors) is defined such that:

$$K(x_i, x_j) = \Phi(x_i) \cdot \Phi(x_j) = e^{-\gamma |x_i - x_j|^2} \quad (1)$$

Here $\gamma$ is a variable kernel parameter, whose value determines the shape (size and form) of the region in the feature space corresponding to the class in question. The single-class decision value for a given defect x is given by:

$$\sum_{i=1}^{k} \alpha_i K(x_i, x) - b \quad (2)$$

wherein $\{x_i\}$ is the set of training vectors, the $\alpha_i$ are Lagrange multipliers, and b is a distance parameter. For a class with kernel function K, defects for which the value of formula (2) is non-negative are considered to be in the class, while defects for which the value is negative are "unknown." Details of this sort of computation and the computation parameter settings are known in the art.

FIG. 6 illustrates the feature space H, in which the training data is mapped on a hypersphere $S_{(O,r=1)}$. The OCSVM algorithm defines a hyperplane W∈H, which is orthogonal to a directed radius w of the hypersphere at a distance b from the origin O, i.e., $\langle w, W \rangle_H - b = 0$. Defects 44 in the class in question lie on the hypersphere between boundary points 100, which represent the support vectors. During the training phase, the ADC machine can obtain the support vectors that will give the smallest spherical cap (smallest θ) for a given confidence threshold. This operation is equivalent to maximizing the distance b. After the OCSVM classifier is trained, "unknown" defect 56 will be found to lie on the far side of hyperplane W (in this case by a distance $\xi_i$).

For optimal performance of the single-class classifier (i.e., maximal purity of automatic classification results at a given rejection rate), the shape of the kernel function can be changed in conjunction with a change in the confidence threshold. This shape change, which may be accomplished by changing the value of the parameter μ, is equivalent to changing the orientation angle θ of the hyperplane W, as shown in FIG. 6. This change can produce a different class confidence border. FIG. 6 illustrates two hyperplanes, with boundary points (support vectors) 100 and 104 and parameters $\mu_1$ and $\mu_2$, respectively. The orientation of the second hyperplanes accepts an additional defect 102, which would have been rejected as "unknown" by the first hyperplane.

The confidence threshold for each of the hyperplanes shown in FIG. 6 is given by a respective parameter $\mu_1$, $\mu_2$. For a given value of μ, the corresponding kernel properties are determined by solving the following minimization problem over the set of training data:

$$\min_{w,b,\xi}\left(\frac{1}{2}w^T w - b + \frac{1}{\mu \cdot l}\sum_{i=1}^{k}\xi_i\right) \quad (3)$$

subject to the constraint that:

$$w^T \Phi(x_i) \geq b - \xi_i, \xi_i \geq 0, i=1,\ldots,k \quad (4)$$

wherein k is the size of the training set (i.e., the number of pre-classified defect images that were used in generating the classifier), and $\xi_i$ is the value of the classification error for each defect.

The problem of formula (3) can be recast as a minimization problem over the vector a of the Lagrange multipliers:

$$\min_{\alpha}\left(\frac{1}{2}\alpha^T Q \alpha\right) \quad (5)$$

subject to the constraints that $e^T \alpha = \mu \cdot k$ and $0 \leq \alpha_i \leq 1$ for all i. Here e is the vector <1, 1, 1, . . . , 1> and Q is the k×k positive semi-definite matrix given by:

$$Q_{i,j} = e^{-\gamma(x_i \cdot x_j)^2} \quad (6)$$

The solution of problem (5) is a set of parametric classification rules (equivalently referred to as rejection rules) for each value of the confidence threshold n. The rules have the general form: $\{x_1, \ldots, x_k, \alpha_1, \ldots, \alpha_k, b, \gamma\}$. An ADC machine can automatically choose the optimal value of the kernel parameter γ, which generates the appropriate shape of the region in feature space corresponding to the class, as given by the kernel function. The parameters of the classification rules are applied in formula (2) to each new defect x.

Figure 7:
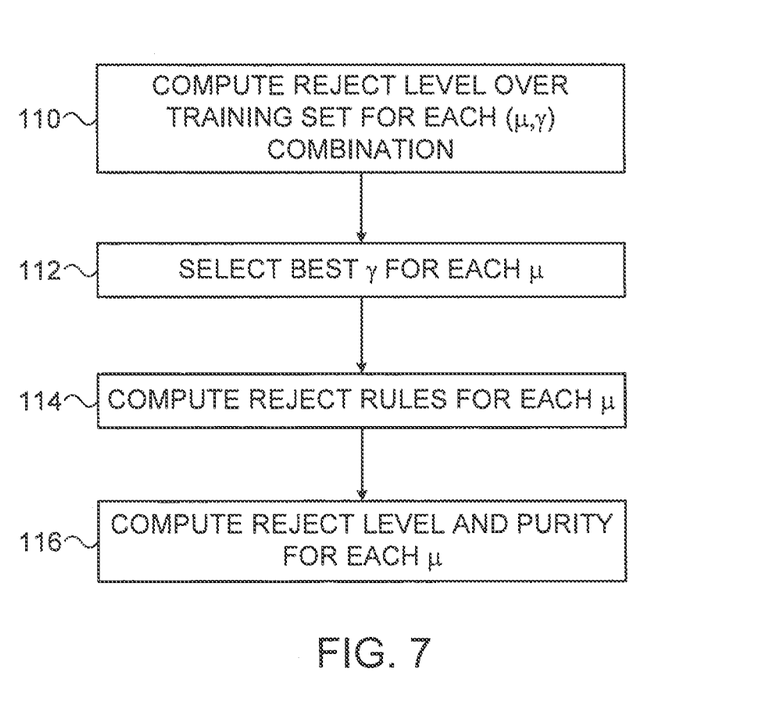
FIG. 7 is a flow diagram illustrating a method for setting classifier kernel parameters, in accordance with an embodiment of the present invention.

FIG. 7 is a flow diagram of an embodiment of a method for setting classifier kernel parameters, in accordance with an embodiment of the present invention. The method is performed by processing logic that may comprise hardware (circuitry, dedicated logic, etc.), software (such as is run on a general purpose computer system or a dedicated machine), or a combination of both. In one embodiment, the method is performed by ADC machine 26 of FIG. 1.

At block 110, processing logic receives a set of pre-classified training data for each defect class of interest, and solves an equation (e.g., problem 5 of FIG. 6) over the training data for each of a number of different values of the confidence threshold (e.g., μ) and the kernel parameter (e.g., γ). Processing logic estimates the rejection rate (i.e., a percentage of the defects in the test set that are classified as "unknown") for each (μ,γ) pair.

At block 112, processing logic selects the optimal value of γ to be used with each μ based on the results of block 110. The optimal value of γ may be defined in various ways, depending on system and application requirements. In one embodiment, the value of γ that gives an actual rejection rate that is closest to the value of μ when the classifier is applied to the training data is selected. For example, if μ is set to 0.1, then the optimal value of γ is the value that gives a 10% rejection rate. In this embodiment, this definition can be particularly useful because it gives the system operator precise control over the rejection rate, and at the same time optimizes the purity of classification of the defects that are accepted by the classifier. In some embodiments, blocks 110 and 112 are repeated for each of a predetermined set of values of μ, and processing logic performs a search over different γ values until it finds the optimal value.

In one embodiment, if the actual rejection rate computed over the test set differs from the value of μ by more than a certain predetermined margin for the best choice of γ, processing logic may determine that there is no optimal γ for this defect class for the confidence level μ in question. In this embodiment, processing logic may provide a recommendation to the system operator not to use the predefined specific rejection rate for this class. Processing logic may further provide a recommendation to the system operator to choose a different rejection rate (e.g., one or more adjacent rejection rates). In some embodiments, an optimal γ is not found for small defect classes, in which the training set is small. In some embodiments, after additional defects of the defect class have been visually classified by the human inspector, these additional defects may be added to the training set, and blocks 110 and 112 may then be repeated in order to refine the automatic classification rules for the class in question.

Referring back to FIG. 4, each of borders 84, 86, 88, 90, corresponds to a different (μ,γ) pair. For example:
  Border 84—μ=0.6, γ=0.2
  Border 86—μ=0.2, γ=0.1
  Border 88—μ=0.15, γ=0.03
  Border 90—μ=0.1, γ=0.01

The confidence value of a given defect may be given by the confidence threshold μ of the closest border outside which the defect falls; thus, the confidence value for defect 82 is P=0.15 in the present example.

Returning now to FIG. 7, at block 114, processing logic computes the rejection rules $\{x_1, \ldots, x_k, \alpha_1, \ldots, \alpha_k, b, \gamma\}$ for each confidence threshold μ, using the optimal value of γ.

At block 116, processing logic applies the rejection rules to the training data to verify the rejection rate for each μ, as well as the purity of the automatic classification results for each μ. In one embodiment, the results of the application of the rejection rules to the training data are graphed as described above in conjunction with FIG. 5. In an alternate embodiment, the results of the application of the rejection rules to the training data are printed to a textual report. The results of the application of the rejection rules to the training data for each defect class can enable the system operator to choose, for example, the rejection rate that will give the desired purity of classification, and vice versa.

Figure 8:
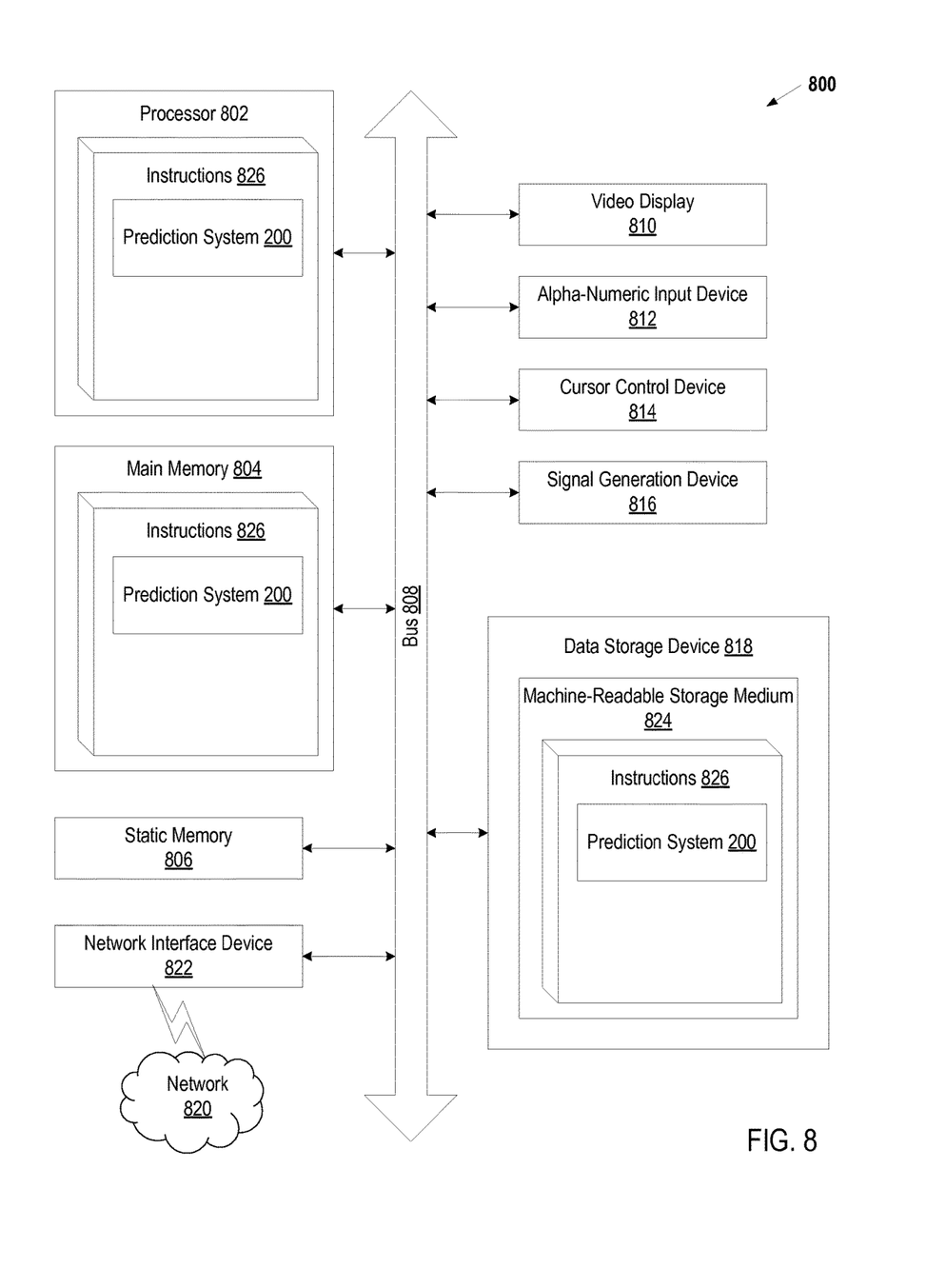
FIG. 8 is a block diagram of an exemplary computer system that may perform one or more of the operations described herein.

FIG. 8 illustrates a diagram of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), double data rate SDRAM (DDR SDRAM), or Rambus DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 820 via the network interface device 822.

In one embodiment, the instructions 826 include instructions for integration of automatic and manual defect classification and/or a software library containing methods that call a module including instructions for integration of automatic and manual defect classification. In one embodiment, the instructions 826 include instructions for integration of automatic and manual defect classification and/or a software library containing methods that call instructions for integration of automatic and manual defect classification. While the computer-readable storage medium 824 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for defect classification comprising:
storing a definition of a region in a feature space, wherein the definition is associated with a defect class and comprises a kernel function, wherein the kernel function comprises a kernel parameter that is associated with a plurality of parameter values, wherein each of the parameter values for the kernel parameter is used to determine a different shape of the region based on the kernel function and corresponds to a different desired rejection rate for automatic classification of a plurality of unclassified defects for the defect class;

receiving, by a processing device, a confidence threshold that corresponds to a desired rejection rate for automatic classification of at least one defect associated with the defect class;

selecting, by the processing device, one of the parameter values of the plurality of parameter values for the kernel parameter that determines the shape of the region and corresponds to the desired rejection rate associated with the confidence threshold for automatic classification of the plurality of unclassified defects;

receiving, by the processing device, inspection data for the plurality of unclassified defects detected in one or more wafer samples under inspection;

automatically classifying, by the processing device, the plurality of unclassified defects for the defect class using the kernel function and the selected one of the plurality of parameter values of the kernel parameter that determines the shape of the region and corresponds to the desired rejection rate for the plurality of unclassified defects to generate a first plurality of classification results, wherein the plurality of unclassified defects are classified with a class label associated with the region based on a location of the unclassified defects in the region with the shape determined from the kernel parameter with the one of the plurality of parameter values that is selected based on the confidence threshold that corresponds to the desired rejection rate;

obtaining a second plurality of classification results for one or more of the plurality of unclassified defects for the defect class; and combining the first plurality of classification results and the second plurality of classification results.

2. The method of claim 1, wherein selecting the one of the values of the kernel parameter comprises:

associating each of a plurality of confidence levels with a unique parameter value of the plurality of parameter values.

3. The method of claim 2, wherein associating each of the plurality of confidence levels comprises:

applying the kernel function to training data to obtain a set of training results using the plurality of parameter values; and for each of the plurality of confidence levels, assigning an optimal parameter value to the confidence level based on the training results.

4. The method of claim 3, wherein assigning the optimal parameter value to the confidence level comprises:

selecting a parameter value for the confidence threshold to result in rejection of a subset of the plurality of defects corresponding to the confidence threshold during an automatic classification of the training data using the kernel function.

5. The method of claim 1, wherein the definition further is of a plurality of regions in the feature space, each of the regions in the feature space is defined by a one-class support vector machine comprising the kernel function, and wherein automatically classifying the plurality of unclassified defects comprises distinguishing between a plurality of first defects belonging to the class and a plurality of second defects that are classified as unknown defects with respect to the class using the one-class support vector machine.

6. The method of claim 5, wherein automatically classifying the plurality of unclassified defects comprises applying a multi-class support vector machine to assign each unclassified defect to a respective defect class, and identifying at least one non-decidable defect from the plurality of unclassified defects, wherein the non-decidable defect is in an overlap area between the plurality of regions of at least two of the defect classes in the feature space, and wherein the automatic classification is performed by a first inspection modality, and wherein the at least one non-decidable defect is provided to a second inspection modality to obtain the second plurality of classification results.

7. The method of claim 5, wherein the one-class support vector machine defines a mapping of the inspection data to a hypersphere in the feature space, and wherein the confidence level and the value of the kernel parameter defines a hyperplane that divides the hypersphere to create a hyperspherical cap, wherein the hyperspherical cap is mapped to a region in feature space containing the plurality of first defects classified as belonging to the class.

8. An apparatus comprising:

a memory to store a definition of a region in a feature space, wherein the definition is associated with a defect class and comprises a kernel function, wherein the kernel function comprises a kernel parameter that is associated with a plurality of parameter values, wherein each of the parameter values for the kernel parameter is used to determine a different shape of the region based on the kernel function and corresponds to a different desired rejection rate for automatic classification of a plurality of unclassified defects for the defect class; and a processor, operatively coupled with the memory, to:

receive a confidence threshold that corresponds to a desired rejection rate for automatic classification of at least one defect associated with the defect class;

select one of the parameter values of the plurality of parameter values for the kernel parameter that determines the shape of the region and corresponds to the desired rejection rate associated with the confidence threshold for automatic classification of the plurality of unclassified defects;

receive inspection data for the plurality of unclassified defects detected in one or more wafer samples under inspection;

automatically classify the plurality of unclassified defects for the defect class using the kernel function and the selected one of the plurality of parameter values of the kernel parameter that corresponds to the desired rejection rate for the plurality of unclassified defects to generate a first plurality of classification results;

obtain a second plurality of classification results for one or more of the plurality of unclassified defects for the class; and combine the first plurality of classification results and the second plurality of classification results, wherein the plurality of unclassified defects are classified with a class label associated with the region based on a location of the unclassified defects in the region with the shape determined from the kernel parameter with the one of the plurality of parameter values that is selected based on the confidence threshold that corresponds to the desired rejection rate.

9. The apparatus of claim 8, wherein the processor is to associate each of a plurality of confidence levels with a unique parameter value of the plurality of parameter values.

10. The apparatus of claim 9, wherein to associate each of the plurality of confidence levels, the processor is to apply the kernel function to training data to obtain a set of training results using the plurality of parameter values, and for each of the plurality of confidence levels, to assign an optimal parameter value to the confidence level based on the training results.

11. The apparatus of claim 10, wherein to assign the optimal parameter value to the confidence level, the processor is to select a parameter value for the confidence threshold to result in rejection of a subset of the plurality of defects corresponding to the confidence threshold during an automatic classification of the training data using the kernel function.

12. The apparatus of claim 8, wherein the region in the feature space is defined by a one-class support vector machine comprising the kernel function, and wherein to automatically classify the plurality of unclassified defects, the processing device is to distinguish between a plurality of first defects belonging to the class and a plurality of second defects that are classified as unknown defects with respect to the class using the one-class support vector machine.

13. The apparatus of claim 12, wherein to automatically classify the plurality of unclassified defects, the processor is to apply a multi-class support vector machine to assign each unclassified defect to a respective defect class, and to identify at least one non-decidable defect from the plurality of unclassified defects, wherein the non-decidable defect is in an overlap area between a plurality of regions of at least two of the defect classes in the feature space, and wherein the automatic classification is performed by a first inspection modality, and wherein the at least one non-decidable defect is provided to a second inspection modality to obtain the second plurality of classification results.

14. The apparatus of claim 12, wherein the one-class support vector machine defines a mapping of the inspection data to a hypersphere in the feature space, and wherein the confidence level and the value of the kernel parameter define a hyperplane that divides the hypersphere to create a hyperspherical cap, wherein the hyperspherical cap is mapped to a region in feature space containing the plurality of first defects classified as belonging to the class.

15. A non-transitory computer readable storage medium having instructions that, when executed by a processing device, cause the processing device to perform operations comprising:
storing a definition of a region in a feature space, wherein the definition is associated with a defect class and comprises a kernel function, wherein the kernel function comprises a kernel parameter that is associated with a plurality of parameter values, wherein each of the parameter values for the kernel parameter is used to determine a different shape of the region based on the kernel function and corresponds to a different desired rejection rate for automatic classification of a plurality of unclassified defects for the defect class;
receiving a confidence threshold that corresponds to a desired rejection rate for automatic classification of at least one defect associated with the defect class;
selecting one of the parameter values of the plurality of parameter values for the kernel parameter that determines the shape of the region and corresponds to the desired rejection rate associated with the confidence threshold for automatic classification of the plurality of unclassified defects;
receiving inspection data for the plurality of unclassified defects detected in one or more wafer samples under inspection;
automatically classifying the plurality of unclassified defects for the class using the kernel function and the selected one of the plurality of parameter values of the kernel parameter that determines the shape of the region and corresponds to the desired rejection rate for the plurality of unclassified defects to generate a first plurality of classification results, wherein the plurality of unclassified defects are classified with a class label associated with the region based on a location of the unclassified defects in the region with the shape determined from the kernel parameter with the one of the plurality of parameter values that is selected based on the confidence threshold that corresponds to the desired rejection rate;
obtaining a second plurality of classification results for one or more of the plurality of unclassified defects for the class; and
combining the first plurality of classification results and the second plurality of classification results.

16. The non-transitory computer readable storage medium of claim 15, wherein to select the one of the values of the kernel parameter, the processing device performs operations comprising:
associating each of a plurality of confidence levels with a unique parameter value of the plurality of parameter values.

17. The non-transitory computer readable storage medium of claim 16, wherein to associate each of the plurality of confidence levels, the processing device performs operations comprising:
applying the kernel function to training data to obtain a set of training results using the plurality of parameter values; and
for each of the plurality of confidence levels, assigning an optimal parameter value to the confidence level based on the training results.

18. The non-transitory computer readable storage medium of claim 17, wherein to assign the optimal parameter value to the confidence level, the processing device performs operations comprising:
selecting a parameter value for the confidence threshold to result in rejection of a subset of the plurality of defects corresponding to the confidence threshold during an automatic classification of the training data using the kernel function.

19. The non-transitory computer readable storage medium of claim 15, wherein the region in the feature space is defined by a one-class support vector machine comprising the kernel function, and wherein automatically classifying the plurality of unclassified defects comprises distinguishing between a plurality of first defects belonging to the class and a plurality of second defects that are classified as unknown defects with respect to the class using the one-class support vector machine.

20. The non-transitory computer readable storage medium of claim 19, wherein to automatically classify the plurality of unclassified defects, the processing device performs operations comprising:
applying a multi-class support vector machine to assign each unclassified defect to a respective defect class, and identifying at least one non-decidable defect from the plurality of unclassified defects, wherein the non-decidable defect is in an overlap area between a plurality of regions of at least two of the defect classes in the feature space, and wherein the automatic classification is performed by a first inspection modality, and wherein the at least one non-decidable defect is provided to a second inspection modality to obtain the second plurality of classification results.

21. The non-transitory computer readable storage medium of claim 19, wherein the one-class support vector machine defines a mapping of the inspection data to a hypersphere in the feature space, and wherein the confidence level and the value of the parameter define a hyperplane that divides the hypersphere to create a hyperspherical cap, wherein the hyperspherical cap is mapped to a region in feature space containing the plurality of first defects classified as belonging to the class.

* * * * *